(12) United States Patent
Burbidge et al.

(10) Patent No.: US 6,239,690 B1
(45) Date of Patent: May 29, 2001

(54) BATTERY ECONOMIZING IN A COMMUNICATIONS SYSTEM

(75) Inventors: Richard C. Burbidge, Basingstoke; David K. Roberts, Horley; Philip A. Jamieson, Dorking; Rodney W. Gibson, Haywards Heath, all of (GB)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/188,750

(22) Filed: Nov. 9, 1998

(30) Foreign Application Priority Data

Nov. 12, 1997 (GB) .................................... 9723743

(51) Int. Cl.⁷ ....................................... H04Q 7/14
(52) U.S. Cl. .................. 340/10.33; 340/825.44; 340/825.21; 370/311.1; 455/343
(58) Field of Search ............... 340/825.44, 10.1, 340/825.21, 870.03, 870.13, 870.28, 870.39, 10.32, 10.33, 10.34; 455/343, 38.3; 370/311

(56) References Cited

U.S. PATENT DOCUMENTS 5,459,457  10/1995  Sharpe ........................... 340/825.44

FOREIGN PATENT DOCUMENTS

0554941B1  8/1993  (EP) .............................. H04Q/7/18
WO9006634  6/1990  (WO) .

*Primary Examiner*—Edwin C. Holloway, III
(74) *Attorney, Agent, or Firm*—Jack D. Slobod (57) ABSTRACT

For battery economizing in a receiving station (CU) having a radio identity code (RIC) consisting of M bits, a base station (MIU) transmits a wake-up message consisting of at least two repetitions of a wake-up sequence having N concatenated parts. Each of the N parts includes a sync code word and a different fraction M/N of bits of a radio identity code (RIC). The receiving station is energized intermittently in order to detect carrier and at least one of the N parts. In response to detecting that one of the N parts is received, the receiving station remains energized and analyzes at least the detected one of the N parts. If the received bits of the transmitted radio identity code do not correspond to the corresponding bits of the receiving station's radio identity code, the receiving station reverts to intermittent energization, otherwise it remains energized to receive a message appended to the transmitted radio identity code. Each of the parts may be appended to a different sync code word identifying the part thereby enabling address identification to be carried out on only that one of the parts. The bits of the transmitted radio identity code may be scrambled prior to being fractionalized into the N parts.

17 Claims, 4 Drawing Sheets

BATTERY ECONOMIZING IN A COMMUNICATIONS SYSTEM

BACKGROUND OF THE INVENTION

1. Field of the Invention

The present invention relates to a method of battery economising in a communications system, a communications system, a transmitting station for use in the system and to a receiving station for use in the system. The communications system may comprise a telecommunications system such as a paging or cordless/cellular telephone system or telemetry system used for example in say an automatic meter reading system.

2. Description of the Related Art

In many telecommunications and telemetry applications, equipments are on standby for extended periods of times, for example months if not years. Consequently for battery powered equipments, any means of extending the useful life of a battery power source is of importance. For radio equipments the receiver is often the dominant source of power consumption within the equipment.

Power saving in receivers of radio equipments is known for example in the digital paging field. For example the POCSAG (or CCIR Radiopaging Code No. 1) has an inherent power saving capability because under the protocol time is divided into successive time periods called batches. A batch comprises a sync code word and 8 frames. A receiver is powered for receipt of a sync code word and for a predesignated one of eight frames in successive batches, any messages for the receiver being transmitted in the predesignated frame. During the time periods between the sync code word and the predesignated frame and vice versa, the receiver can be powered down.

EP-B1-0 554 941 discloses the option of a paging system controller transmitting address or receiver identity codes (RICs) in an order of increasing or decreasing numerical significance and if a pager notes from the first few bits of an address being received that it follows after its address in the ordered sequence and therefore there is not a call or message for itself, the receiver section of the pager is powered down before the end of the frame in order to save power.

WO 90/06634 discloses the concept of a portable receiver receiving a 32 bit sync code word and checking the sync code word in 2 parts, firstly the first 8 bits and secondly the last 24 bits. If the first part is received having less than two bit errors, the sync code word is considered detected and power control means in the portable receiver powers down the receiving stage for the duration of the second part. If the result is not acceptable, the receiver remains energised for the remaining 24 bits of the sync code word and the result is accepted if there are less than 3 errors in the remaining 24 bits.

This citation also mentions power conservation by disabling the receiving stage or operating a microcomputer in the portable receiver in a low power mode, or by doing both.

Paging systems are structured in that the air interface protocol determines, once the pagers are synchronised, when the receivers should be energised or not. However there are other applications such as telemetry as applied to for example automatic meter reading systems where transceivers coupled to metering units are required to transmit parcels of data in response to the receipt of an infrequently given request. In the interests of power saving the transceivers have to be controlled to minimise the energisation of the receivers whilst ensuring that a prompt response can be given to an interrogation signal.

OBJECT AND SUMMARY OF THE INVENTION

An object of the present invention is to facilitate power saving in communications apparatus which are on standby for long time periods.

According to one aspect of the present invention there is provided a method of battery economising in a communications system comprising a transmitting station and a receiving station having a radio identity code consisting of M bits, characterised by transmitting a wake-up message comprising at least two repetitions of a wake-up sequence, the wake-up sequence comprising N concatenated parts, where N is an integer, each of said N parts including a sync code word and a different fraction M/N of bits of a radio identity code, by energising the receiving station intermittently in order to detect at least one of said parts, by the receiving station remaining energised and analysing said at least one of said parts, and by de-energising the receiving station in response to determining that the received bits of the radio identity code do not correspond to the corresponding bits of the receiving station's radio identity code.

According to a second aspect of the present invention there is provided a communications system comprising a transmitting station and a receiving station having a radio identity code consisting of M bits, characterised in that the transmitting station has means for transmitting a wake-up message comprising at least two repetitions of a wake-up sequence, the wake-up sequence comprising N concatenated parts, where N is an integer, each of said N parts including a sync code word and a different fraction M/N of bits of a radio identity code, the receiving station has means for intermittently energising its receiver in order to detect at least one of said parts, for remaining energised and for analysing said at least one of said parts, and for de-energising the receiving station in response to determining that the received bits of the radio identity code do not correspond to the corresponding bits of the receiving station's radio identity code.

According to a third aspect of the present invention there is provided a transmitting station for use in a communications system including a receiving station having a radio identity code consisting of M bits, characterised in that the transmitting station has means for transmitting a wake-up message comprising at least two repetitions of a wake-up sequence, the wake-up sequence comprising N concatenated parts, where N is an integer, each of said N parts including a sync code word and a different fraction M/N of bits of a radio identity code.

According to a fourth aspect of the present invention there is provided a receiving station for use in a communications system comprising a transmitting station and the receiving station, said receiving station having a radio identity code consisting of M bits, wherein the transmitting station has means for transmitting a wake-up message comprising at least two repetitions of a wake-up sequence, the wake-up sequence comprising N concatenated parts, where N is an integer, each of said N parts including a sync code word and a different fraction M/N of bits of a radio identity code, characterised in that the receiving station has radio identity code detecting means and means for intermittently energising its receiver in order to detect at least one of said parts, for remaining energised whilst said at least one of said parts is being analysed by said radio identity code detecting means, and for de-energising the receiving station in response to determining that the received bits of the radio identity code do not correspond to the corresponding bits of the receiving station's radio identity code.

In order to maximise the chance that a receiving station may reject a radio identity code after receiving one of the parts of a wake-up sequence, the bits of the radio identity code are randomised prior to fractionalising.

In an embodiment of the present invention the bits of the radio identity code are randomised by applying the bits to stages of a linear feedback shift register with a generator polynomial for generating an M-sequence, clocking the shift register a predetermined number of times, and reading-out the new contents of the shift register. By using a linear feedback shift register with a generator polynomial for randomising the bits of the radio identity code, a high degree of randomisation is achieved. Furthermore a unique mapping of the radio identity code is obtained. In operation of the shift register the number of times that the shift register is clocked corresponds to at least the number of bits in the radio identity code thereby ensuring that every bit of the radio identity code contributes to the randomising operation.

If desired a different sync code word may precede each of the N parts of the wake-up sequence. The receiving station in response to detecting a particular sync code word indicating which of the N parts is being received will know which bits of the radio identity code are to be compared with the received bits.

In an embodiment of the invention in which a wake-up message comprises a relatively large number of wake-up sequences, it is advantageous to group the sequences into early and late portions of the wake-up message and include in each of the sync code words indicia indicative of in which of the early and late portions the sync-code word is located. A receiving station in response to a receiving station recognising its radio identity code in the early portion continues to intermittently energise at least its receiver until the later portion of the wake-up message is detected whereat its receiver is energised continuously in order to receive a message concatenated with the wake-up message. By delaying the instant at which the receiver is energised continuously the overall power consumption is reduced.

BRIEF DESCRIPTION OF THE DRAWING

The present invention will now be described, by way of example, with reference to the accompanying drawings, wherein.

In the drawings the same reference numerals have been used to indicate corresponding features.

DETAILED DESCRIPTION OF THE PREFERRED EMBODIMENTS

Figure 1:
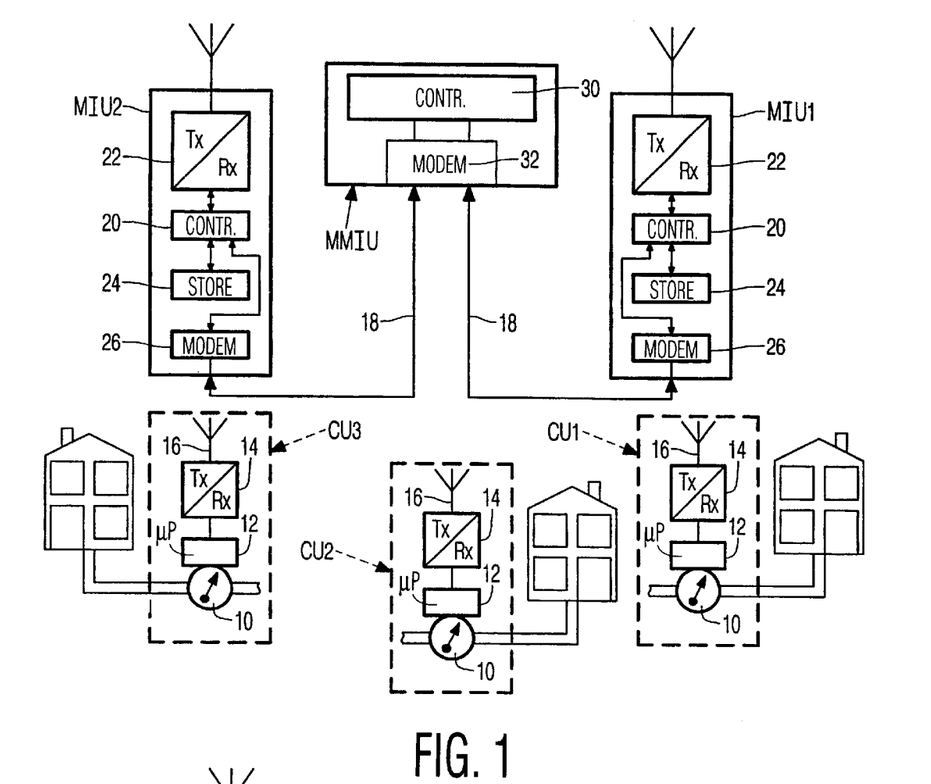
FIG. 1 is a diagrammatic view of a simplified embodiment of an automatic water metering system.

Referring to FIG. 1, the simplified embodiment of the automatic water metering system comprises a plurality of consumer units CU1, CU2, CU3 attached to water conduits supplying domestic premises. Each of the consumer units CU1 to CU3 comprises a metering unit 10 operatively coupled to a microprocessor 12 and a transceiver 14 having an antenna 16 which may be incorporated into or comprise a cover for a socket set into the ground and containing the consumer unit CU1 to CU3.

The consumer units CU1 to CU3 can be interrogated remotely by in range management interface units (MIU) MIU1, MIU2 which relay meter reading information by way of land lines 18, such as the PSTN, or further radio links (not shown) to a master MIU, MMIU, which amongst other tasks controls the operation of the metering system and the billing of customers. Additionally the consumer units CU1 to CU3 may be interrogated remotely by portable MIUs (not shown) which store the meter reading information for later transfer to the master MIU, MMIU.

In FIG. 1, each of the MIUs, MIU1 and MIU2, covers a respective plurality of meters in a particular geographic area. In order to be able to do this, each of the MIUs is mounted in an elevated position on say a dedicated mast or a lamppost. Each of the MIUs comprises a controller 20 for controlling the operation of a transceiver 22 which may be similar to the transceiver 14 of the consumer unit, the storage of meter information in a store 24 and the relaying of the stored meter information by way of a modem 26.

The MMIU has a controller comprising a large computer 30 which is coupled to a modem 32 which enables communication to be effected by way of the land lines 18.

Figure 2:
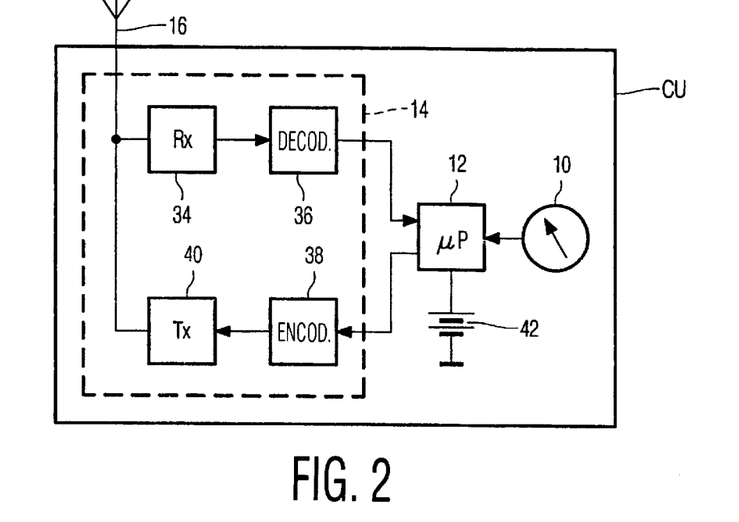
FIG. 2 is a block schematic diagram of a consumer unit.

The consumer unit CU shown in FIG. 2 comprises a metering unit 10 which provides a digital output to a microprocessor 12. The transceiver 14 comprises a receiver 34 for receiving signals from the antenna 16 and demodulates them. The demodulated signals are decoded in a decoder 36 and the decoded signals are applied to the microprocessor 12.

Conversely if the microprocessor 12 wants to transmit signals to the MIU, the signals are encoded in an encoder 38 and the encoded signals are modulated and transmitted by a transmitter 40.

The consumer unit CU is a self contained unit which is powered by a low leakage battery 42, such as a lithium cell. In order to maximise the working life of the battery it is necessary to adopt an air interface protocol which enhances battery economy. The performance of radio equipment used in automatic meter reading systems is governed by a number of official standards such as the UK Radiocommunications Agency Standard MPT 1601, Issue 2, 1996 and ETSI (European Telecommunication Standards Institute) Standard I-ETS 300 200, December 1996. One feature of these standards is the requirement for a consumer unit to have a maximum transmitter on time of 1% in any one hour period (that is 36 seconds). In spite of this feature it is still necessary to reduce the on time significantly more by adopting a more rigorous battery saving protocol.

The embodiment of the system being described requires each transceiver whether within a consumer unit CU or MIU to have a respective 32 bit address thereby enabling each transceiver to be called on a point to point basis. Additionally the system has provision for multicast addressing which allows a single message to be addressed to a group of transceivers. Irrespective of the number of groups created for multicasting, there should be at least one supergroup covering all the transceivers in consumer units.

In the case of a single frequency system it is desirable to separate MIU and consumer unit transmissions in time. For example a time cycle may be allocated to a particular MIU in order that it can communicate with consumer units within its radio coverage area. For example the MIU transmits a wake-up call to a predetermined consumer unit and then switches to receive in order to permit the addressed consumer unit to reply.

Figure 3:
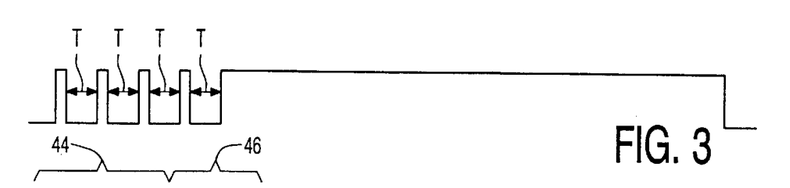
FIG. 3 illustrates an example of a consumer unit being energised initially intermittently and then continuously.

In order to effect battery economy, the transceivers are energised at regular intervals to listen for signals on its channel. This is shown in FIG. 3. To ensure that the transceivers are able to receive at least a part of the wake-up message, the wake-up message WU (FIG. 4) itself must have a length greater than the duration of the regular intervals T when the transceiver is switched-off.

When the receiver section of a transceiver is powered-up, it performs a carrier detection and if no signal is found, it goes back to sleep for time T. If a carrier is detected, the receiver section obtains bit and word synchronisation and then decodes address information to determine if it is the addressee of the message that follows. If it is the addressee, it remains energised to receive a start of message sequence SOM (FIG. 4) and the concatenated message MES (FIG. 4).

In order to effect battery economy it is necessary for the consumer unit to determine if it is being addressed and if not to power down as quickly as possible.

Figure 4:
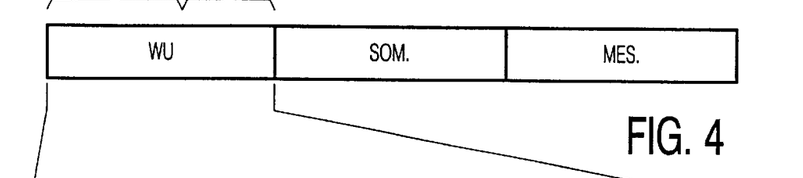
FIG. 4 is an example of a wake-up message and concatenated start of message sequence and message.

FIG. 4 illustrates a wake-up message WU which comprises a first portion 44 (FIG. 4), which is the earlier portion, and a second portion 46, which is the later portion. The wake-up message is concatenated with the start of message sequence SOM and the message MES proper.

Figure 5A:
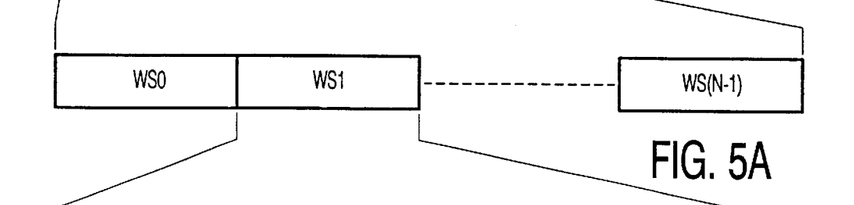
FIG. 5A illustrates the structure of a wake-up message.
Figure 5B:
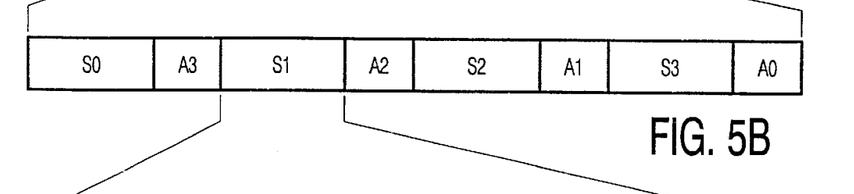
FIG. 5B illustrates the structure of a wake-up sequence.
Figure 6:
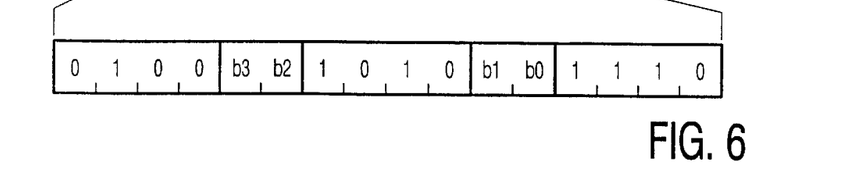
FIG. 6 illustrates the structure of a sync code word.

FIGS. 5A, 5B and 6 illustrate the structure of a wake-up message WU for an individual consumer unit. As shown in FIG. 5A the structure comprises a plurality of concatenated wake-up sequences WS0, WS1 . . . WS(N−1).

FIG. 5B illustrates the structure of one example of a wake-up sequence for an individual address. The sequence assumes that a 32-bit address is divided into 4 bytes each of 8 bits. The wake-up sequence commences with a first 16 bit sync code word SO which is concatenated with a first of the address bytes A3. The sequence is completed by alternating second to fourth sync code words S1 to S3 with address bytes A2, A1 and A0 to make a fixed length of 96 bits.

The address byte A3 is the most significant byte.

In a simple example of a consumer unit being synchronised with the wake-up signal, if it determines that the address byte A3 is not part of its address, it switches off its receiver section for the remainder of that sequence. Otherwise if byte A3 is accepted, it checks byte A2 and so on so that by the end of the sequence it will have determined whether or not all 4 bytes comprise its address.

However in a practical situation, the wake-ups by consumer units will not necessarily be synchronised with the start of a wake-up sequence. Consequently when a consumer unit is woken up it detects carrier and say receives say part of address byte A2 and sync code word S2. As it is not able to make a decision on the fragment of the sequence received it remains energised to receive the remainder of the sync code word S2 and the address byte A1. To facilitate identifying which byte is being received each of the sync code words S0 to S3 include bits identifying the number of the address byte that follows the sync code word.

FIG. 6 illustrates an example of a 16 bit sync code word in which 12 of the bits comprise a fixed pattern and four bits b0 to b3 comprise signalling bits. The signalling bits have the meanings tabulated below:

| Signalling bit | Description |
| --- | --- |
| b1, b0 | 2-bit number indicating the number of the address byte that follows the synchronisation word. b1 is the most significant bit |
| b2 | Identifies the following addressing mode:<br>0 - multicast addressing<br>1 - individual addressing |
| b3 | Identifies the first or second portion of the Wakeup.<br>0 - first part of Wakeup<br>1 - second part of Wakeup |

Bits b1, b0 identify the transmitted address byte appended to the sync code word so that the processor 12 can determine which of the bits of its address are to be compared with the bits in the received address byte.

If a consumer unit CU determines from the bit b3 in the sync code word that identification of its address has occurred during the first portion 44 (FIG. 4) of the wake-up message WU, it resumes the sampling strategy in order to save battery power until the consumer unit CU determines from the change in value of the bit b3 that it is now receiving signals in the second portion 46 (FIG. 4), in which case the receiver section of the consumer unit CU remains continuously energised to receive the start of message sequence SOM.

Figure 7:
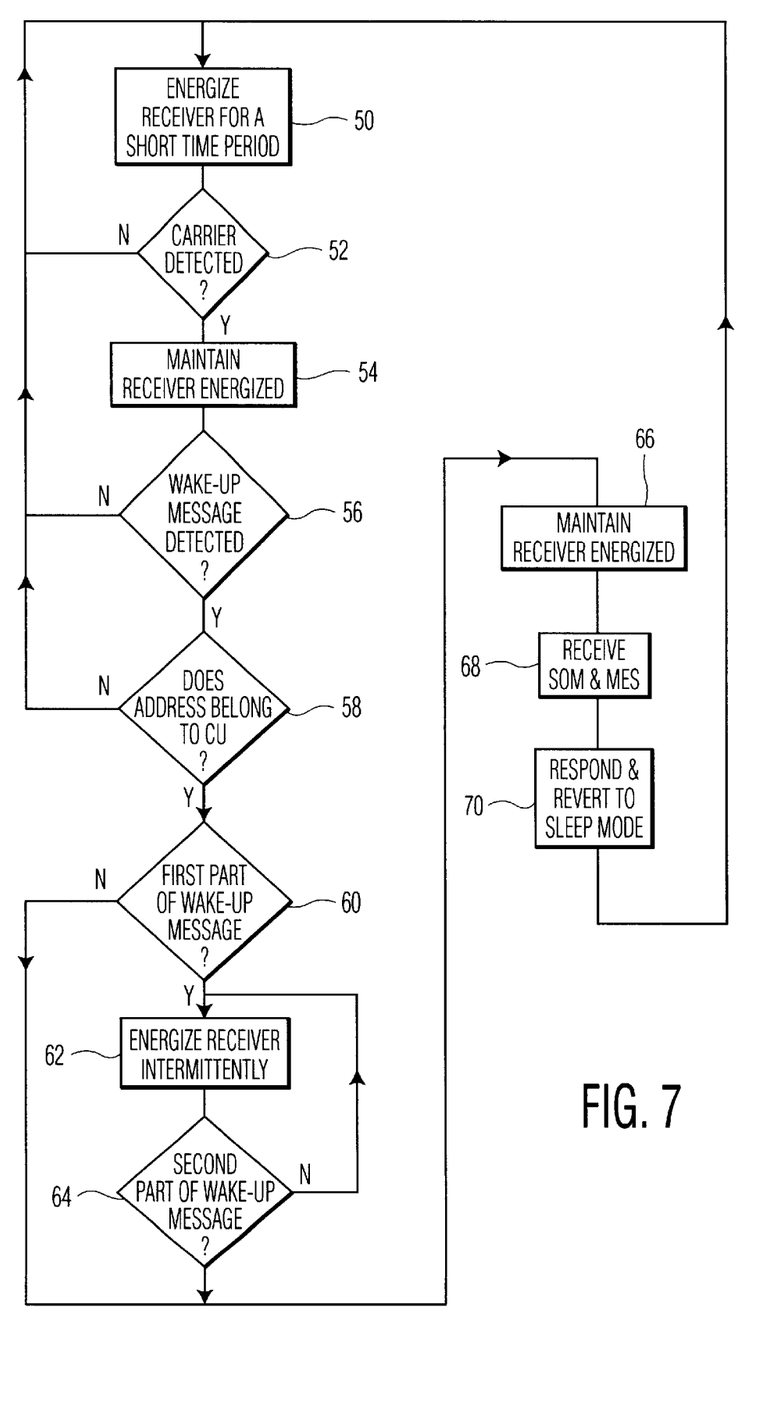
FIG. 7 is a flow chart illustrating the operations involved in detecting a message.

Referring to the flow chart shown in FIG. 7, block 50 indicates energising the receiver section of a consumer unit for a short time period in order to detect carrier. Block 52 relates to checking if carrier has been detected.

If the answer is no (N), the process returns to the block 50. If carrier has been detected (Y), then in block 54 the receiver remains energised to detect the wake-up message. In block 56 a check is made to see if the wake-up message has been detected. If the answer is no (N), the flow chart reverts to the block 50.

If the answer is yes (Y), in block 58 a check is made to see if the address belongs to the consumer unit. If the answer is no (N), the flow chart reverts to the block 50. If the answer is yes (Y), a check is made in block 60 if the receiver is operating in the first part of wake-up, that is, is bit b3=0. If the answer is yes (Y), the receiver reverts to being energised intermittently as indicated by block 62. In block 64, a check is made to see if the receiver is now operating in the second part of wake-up, that is, b3=1. If the answer is no (N), the flow chart reverts to the input of the block 62, but if it is yes (Y), the flow chart proceeds to block 66 which relates to maintaining the energisation of the receiver of the consumer unit.

If the answer to the block 60 is no (N) indicating that the receiver is operating in the second part of wake-up, the flow chart proceeds also to the block 66.

Block 68 relates to the receiver receiving the start of message sequence SOM and the concatenated message MES. Block 70 represents the consumer unit responding to the message and reverting to a sleep mode. The flow chart reverts to the block 50.

For individual addressing of the consumer units the four bytes A3 to A0 of the address should have approximately random properties in order to maximise the chance that the consumer unit is able to reject the address being transmitted after receiving only one of the address bytes. Each byte may take one of 256 different values. To facilitate the randomisation, the address may be mapped onto a randomised address for use in the wake-up message WU. If the randomisation is successful, then in 255 out of 256 cases the wake-up address byte will not match that of the receiving consumer unit, and the consumer unit can reject the address after having seen one byte out of four.

Figure 8:
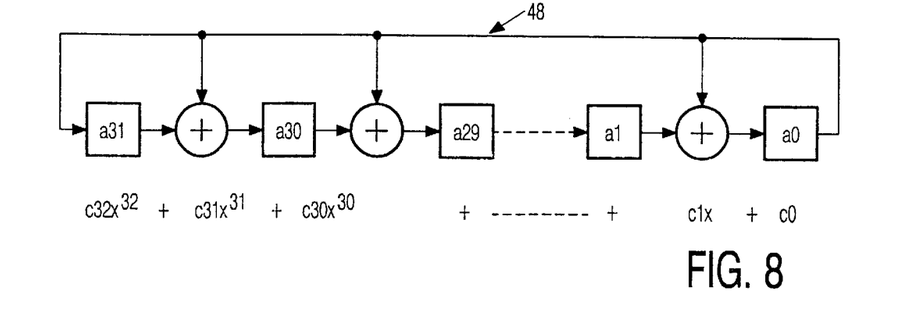
FIG. 8 illustrates an embodiment of randomising address bits by means of a maximal length pseudo-random sequence.

FIG. 8 illustrates performing random mapping using a 32 bit linear feedback shift register 48 with a generator polynomial which is configured to generate a maximal length pseudo-random sequence or M-sequence. The 32 bit radio address is loaded in parallel into the stages a0 to a31 of the shift register 48 which is clocked 32 times to give a randomised address. Certain choices of generator polynomial (represented in hex) such as 1 0FC2 2F87 give "maximal-length" or "M"-sequences i.e. an r-bit shift register, where r=32 for example, generates a sequence of length $2^r-1$ bits. During the generation of an M-sequence, the contents of the shift register cycles through all $2^r-1$ non-zero r-bit numbers. The order in which these numbers appear in the shift register depends on the generator polynomial and may be approximately random. In FIG. 8, a31, a30 . . . a0 are address bits with a31 being the most significant bit and c32, c31 . . . c0 are coefficients of the generator polynomial. The scrambled address is the new contents of the shift register and are read-out in parallel. Using a linear feedback shift register with a generator polynomial gives a high degree of randomisation and a unique mapping of the radio address. Although the shift register 48 can be clocked by less than the number of bits in the radio address, clocking the shift register by at least the number of bits in the radio address ensures that all the bits contribute to the randomising operation.

No randomisation is done on a multicast address because all bytes of the address are needed before a decision to reject the address can be made.

Figure 9A:
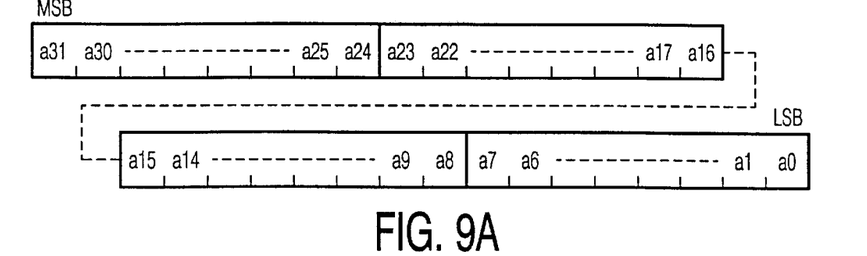
FIGS. 9A and 9B illustrate another embodiment of an address randomising scheme.
Figure 9B:
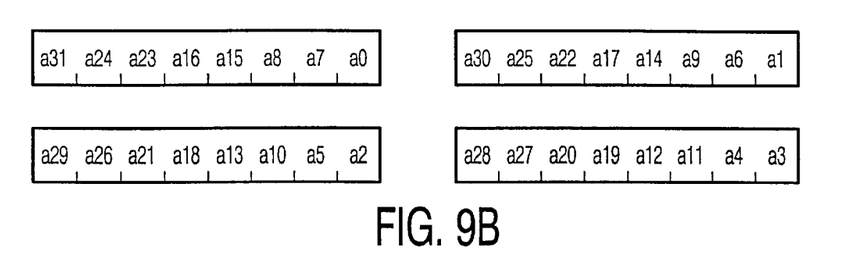

FIGS. 9A and 9B illustrates a randomisation scheme in which the least significant bits of the address are distributed evenly over the different parts of the scrambled address.

FIG. 9A represents the unscrambled 4 bytes of the radio address and FIG. 9B represents 4 bytes of scrambled address, each byte containing 2 bits from each byte of the unscrambled address shown in FIG. 9A. For a group of consumer units with sequential addresses, the most significant bits of the addresses will be the same for all of the consumer units. The least significant bits provide a way of differentiating between the consumer units. Therefore in this scheme it is important that each byte of a scrambled address contains some of the least significant bits.

Figure 10A:
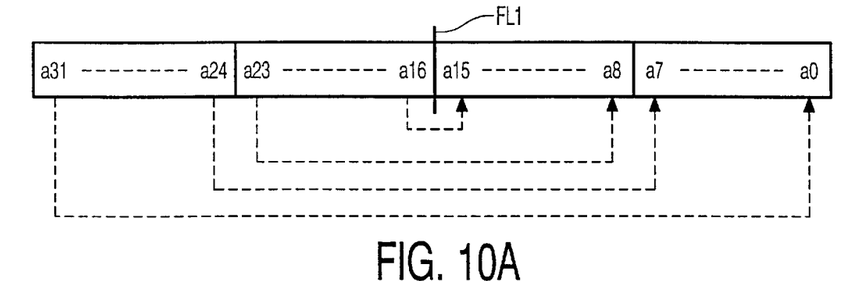
FIGS. 10A, 10B and 10C illustrate a further embodiment of randomising bits by exclusive-OR folding.
Figure 10B:
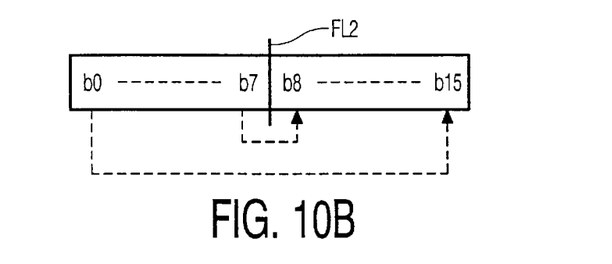
Figure 10C:
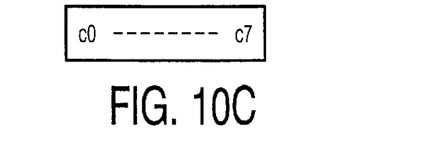

FIGS. 10A, 10B and 10C illustrate randomising bits by exclusive-OR (XOR) folding. FIG. 10A illustrates the unscrambled address about a central fold line FL1. The address bits in corresponding bit positions on either side of the fold line FL1 are combined by XOR operations and the result is shown in FIG. 9B. Thus:

b0=a16 ⊕ a15
b7=a23 ⊕ a8
b8=a24 ⊕ a7
b15=a31 ⊕ a0

FIG. 10B includes a central fold line FL2 and the bits in corresponding bit positions on either side of the fold line FL2 are combined by XOR operations and the result is shown in FIG. 10C which shows one byte of the scrambled address. Thus:

c0=b7 ⊕ b8
c7=b0 ⊕ b15

The other 3 bytes of the scrambled address can be formed by folding or overlapping in different ways, for example c0=b0 ⊕ b8
c7=b7 ⊕ b15

An advantage of this scheme is that each part of the scrambled address contains information derived from all of the bits of the original address.

In order to illustrate the effectiveness of the method in accordance with the present invention, the following tabular summary is given which is based on sync code words comprising 16 bits, address code words comprising 32 bits formatted as 4 bytes of 8 bits and a bit rate of 1200 bits/s.

| Addressing mode | Minimum | | Maximum | | Average | |
|---|---|---|---|---|---|---|
| | bits | ms | bits | ms | bits | ms |
| Individual | 16 + 16 + 8 = 40 | 33 | 16 + 40 + 8 = 64 | 53 | 16 + 28 + 8 = 52 | 43 |
| Multicast (1 byte) | 16 + 16 + 8 = 40 | 33 | 16 + 40 + 8 = 64 | 53 | 16 + 28 + 8 = 52 | 43 |
| Multicast (4 byte) | 16 + 16 + 80 = 112 | 93 | 16 + 40 + 80 = 136 | 113 | 16 + 28 + 80 = 124 | 103 |

The address rejection times given in the above table are based on the following assumptions:
a) The address rejection time is in addition to the carrier detection time.
b) The receiver of the consumer unit must obtain both bit and word synchronisation before it can decode an address byte. In the above table the number of bits is shown as a sum of three components:
1. The number of bits required to obtain bit synchronisation (data from the receiver is not valid until after bit synchronisation).
2. The number of bits required for word synchronisation.
3. The number of bits required to decode enough address information to reject the address.
c) Bit synchronisation is achieved in 16 bits.
d) Word synchronisation is achieved after a complete sync code word has been received. The time taken for this depends on where within the wake-up sequence the receiver starts producing valid data. If the first valid bit produced is the first bit of a sync word then it takes 16 bits. If the first valid bit is the second bit of a sync code word then it takes 40 bits.
e) In individual addressing mode, only one address byte needs to be decoded in order to reject the address. As the scrambled address byte is approximately random then the chance that more than one address byte is required is 1/256. It is assumed that this has little effect on the average rejection time.

It is also possible for the address to be rejected after less than one byte of the randomised address. Again, it is assumed that this has little effect on the average rejection time.

f) In multicast addressing mode all of the address bytes that are transmitted need to be decoded in order to reject the address. If the address is only a single byte then the rejection time is the same as for an individual address. If the address is four bytes then the rejection time is approximately twice as long as for an individual address.

From reading the present disclosure, other modifications will be apparent to persons skilled in the art. Such modifications may involve other features which are already known in the design, manufacture and use of telecommunication and telemetry systems and component parts thereof and which may be used instead of or in addition to features already described herein.

What is claimed is:

1. A method of battery economizing in a communications system comprising a transmitting station and a receiving station having a radio identity code consisting of M bits, said method comprising the transmitting station transmitting a wake-up message comprising at least two repetitions of a wake-up sequence, the wake-up sequence comprising N concatenated parts, where N is an integer greater than one, each of said N parts including a sync code word and a different fraction M/N of bits of a radio identity code of a receiving station, the receiving station being energized intermittently in order to detect at least one of said parts, the receiving station remaining energized when at least one of said parts is detected and said at least one of said parts is analyzed, and the receiving station being de-energized in response to determining that the received bits of the transmitted radio identity code do not correspond to the corresponding bits of the receiving station's radio identity code.

2. A method as claimed in claim 1, wherein bits of the radio identity code to be transmitted are randomized prior to being fractionalized into the N parts.

3. A method as claimed in claim 1, wherein the sync code words in the N parts are different.

4. A method as claimed in claim 1, wherein the wake-up message comprises an earlier transmitted portion and a later transmitted portion, each of the sync code words includes indicia indicative of in which of said early and late portions it is located, and in response to a receiving station recognizing its radio identity code in the early portion, it continues to intermittently energize at least its receiver section until the later portion of the transmitted wake-up message is detected and then maintain at least its receiver section continuously energized in order to receive a message concatenated with the wake-up message.

5. A communications system comprising a transmitting station and a receiving station having a radio identity code consisting of M bits, the transmitting station having means for transmitting a wake-up message comprising at least two repetitions of a wake-up sequence, the wake-up sequence comprising N concatenated parts, where N is an integer greater than one, each of said N parts including a sync code word and a different fraction M/N of bits of a radio identity code, the receiving station having a receiver section, means for intermittently energizing at least its receiver section in order to detect at least one of said parts, for remaining energized when at least one of said parts is detected and for analyzing said at least one of said parts, and for being de-energized in response to determining that the received bits of the transmitted radio identity code do not correspond to the corresponding bits of the receiving station's radio identity code.

6. A system as claimed in claim 5, wherein the transmitting station has means for randomizing bits of the radio identity code to be transmitted prior to fractionalizing the bits of the radio identity code into the N parts.

7. A system as claimed in claim 6, wherein the means for randomizing bits of the radio identity code comprises a linear feedback shift register with a generator polynomial for generating an M-sequence, means for clocking the shift register a predetermined number of times to produce new contents of the shift register, and means for reading-out the new contents of the shift register.

8. A system as claimed in claim 5, wherein the sync code words in the N parts are different.

9. A system as claimed in claim 5, wherein the wake-up message comprises an earlier transmitted portion and a later transmitted portion, the transmitting station has means for including into each of the sync code words indicia indicative in which of said early and late portions the sync code word is located, and the receiving station has means responsive to recognizing its radio identity code in the early portion for continuing to intermittently energize at least its receiver section until the later portion of the transmitted of the wake-up message is detected and then maintain at least its receiver section continuously energized in order to receive a message concatenated with the wake-up message.

10. A transmitting station for use in a communications system including receiving stations having respective radio identity codes consisting of M bits, the transmitting station comprising means for transmitting a wake-up message comprising at least two repetitions of a wake-up sequence, the wake-up sequence comprising N concatenated parts, where N is an integer greater than one, each of said N parts including a sync code word and a different fraction M/N of bits of a radio identity code of a receiving station.

11. A transmitting station as claimed in claim 10, further comprising means for randomizing bits of the radio identity code to be transmitted prior to fractionalizing the radio identity code into the N parts.

12. A transmitting station as claimed in claim 10, wherein the sync code words in the N parts are different.

13. A transmitting station as claimed in claim 10, wherein the wake-up message comprises an earlier transmitted portion and a later transmitted portion, and further comprising means for including into each of the sync code words indicia indicative of in which of said early and late portions the sync code word is located.

14. A receiving station for use in a communications system comprising a transmitting station and receiving stations having respective radio identity codes consisting of M bits, wherein the transmitting station has means for transmitting a wake-up message comprising at least two repetitions of a wake-up sequence, the wake-up sequence comprising N concatenated parts, where N is an integer greater than one, each of said N parts including a sync code word and a different fraction M/N of bits of a radio identity code of a receiving station, the receiving station comprising a receiver section, radio identity code detecting means, and means for intermittently energizing at least its receiver section in order to detect at least one of said parts, for remaining energized whilst said at least one of said parts is being analyzed by said radio identity code detecting means, and for being de-energized in response to determining that the received bits of the radio identity code do not correspond to the corresponding bits of the receiving station's radio identity code.

15. A receiving station as claimed in claim 14, wherein the transmitting station has means for randomizing bits of the radio identity code to be transmitted prior to fractionalizing the radio identity codeinto the N parts, and the radio identity code detecting means has means for detecting if the randomized bits as received correspond to the relevant bits in the receiving station's receiver identity code.

16. A receiving station as claimed in claim 14, wherein the sync code words in the N parts are different, and the receiving station has means for identifying each of the sync code words and for adapting the radio identity code detecting means to detect the bits of the radio identity code concatenated with the particular sync code word.

17. A receiving station as claimed in claim 14, wherein the wake-up message comprises an earlier transmitted portion and a later transmitted portion and wherein the sync code words include indicia indicative of in which of said early and late portions the sync code word is located, and the receiving station has means responsive to recognizing its radio identity code in the early portion for continuing to intermittently energize at least its receiver section until the later portion of the transmitted wake-up message is detected and then said means causes the receiver to be energized continuously in order to be able to receive a message concatenated with the wake-up message.

* * * * *